May 20, 1930.  J. F. O'CONNOR  1,758,965
ANTIFRICTION BEARING
Filed Dec. 29, 1926
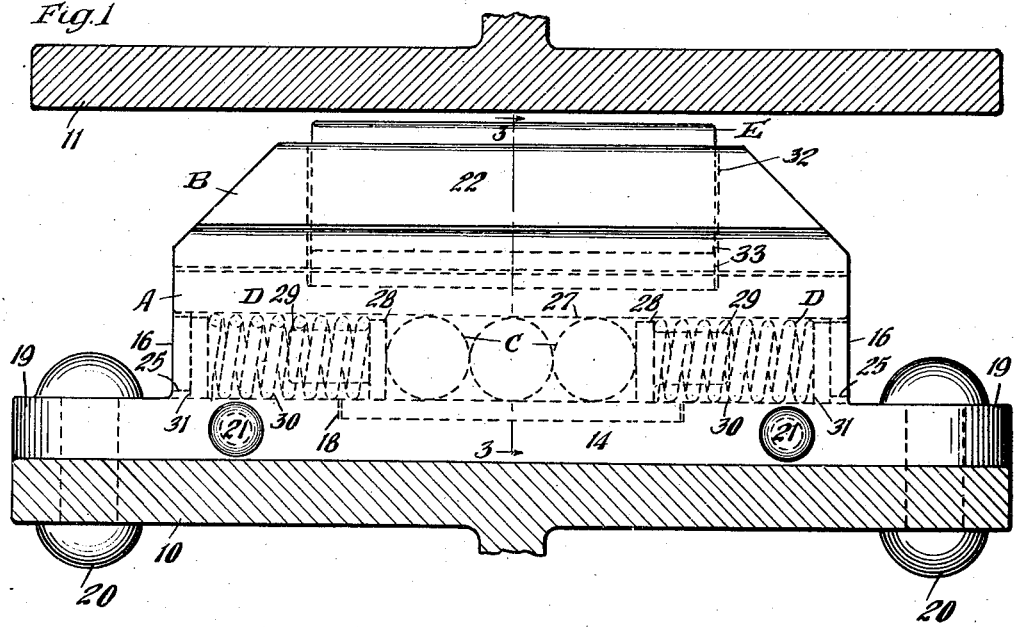
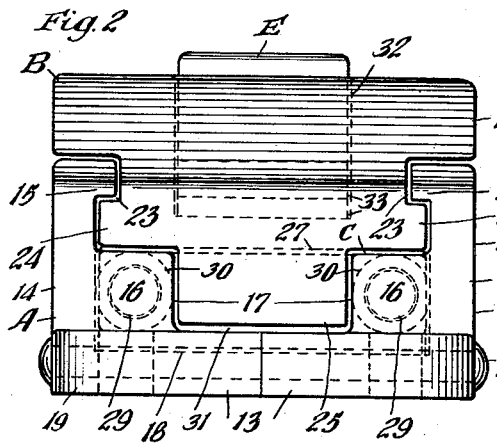
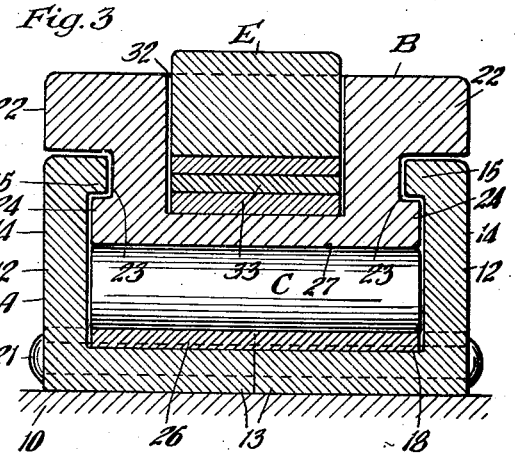

Patented May 20, 1930

1,758,965

UNITED STATES PATENT OFFICE

JOHN F. O'CONNOR, OF CHICAGO, ILLINOIS, ASSIGNOR TO W. H. MINER, INC., OF CHICAGO, ILLINOIS, A CORPORATION OF DELAWARE

ANTIFRICTION BEARING

Application filed December 29, 1926. Serial No. 157,659.

This invention relates to anti-friction bearings.

In the side bearing art there is a demand for an efficient side bearing which has anti-friction properties, and in connection with which the vertical overall height thereof may be adjusted from time to time to afford proper clearance between the body and truck bolsters. Heretofore attempts have been made to produce a bearing of this character, which bearings may be grouped into two classes, first those constructions in which the bearing rests upon detachable blocks which are varied in position to raise and lower the anti-friction device, and secondly, those constructions which include means for varying the vertical overall height by disassembling the operative parts of the anti-friction members and changing certain of the elements thereof, after which said operative parts are reassembled. The first class of anti-friction devices is open to a very serious objection in that it is impossible to so secure the same to the bolster that they will remain in position for any appreciable length of time without the detachable parts working loose and thereby becoming ineffective to accomplish the desired purpose. The second class of anti-friction devices above referred to are open to a more serious objection in that the operative parts of the bearing have to be disassembled in order to make the adjustments, and then again reassembled to recondition the same for operative use.

An object of my invention is to provide a side bearing device having anti-friction properties, and which is of such character that the same may be securely and permanently fixed in position, wherein the operative parts are so assembled that the same cannot be disassembled without destructive effect and wherein the overall vertical height thereof may be readily adjusted without destructive effect and without disassembling or disturbing the operative parts of the mechanism.

A more particular object of the invention is to provide an anti-friction bearing adapted for application to a bolster of a railway car and including a two-part base member fixedly secured to the bolster and a cap adapted to be inter-connected with said base member when the two parts thereof are placed in operative position, together with anti-friction means interposed between the base member and cap, and centering means co-operating with said cap for returning the latter and the anti-friction elements to central position when free from load, in conjunction with a bearing block carried by said cap and adapted to engage the opposed bolster, there being means associated with the cap and bearing block for adjusting the vertical height of the latter without the necessity of disturbing any of the operative parts of the device.

Other and further objects of the invention will more clearly appear from the description and claims hereinafter following.

In the drawing forming part of this specification, Figure 1 is a vertical sectional view taken through the ends of the body and truck and bolsters of a railway car, showing my improvements in connection therewith. Figure 2 is an end elevational view of the side bearing showing the same detached from the bolster. And Figure 3 is a transverse vertical sectional view of the invention taken substantially on the line 3—3 of Figure 1.

In said drawing, 10 denotes the upper portion of a truck bolster of a railway car, and 11 the opposed lower part of a body bolster. My improved bearing as shown, is attached to the truck bolster 10.

The improved bearing, as shown, comprises, broadly, a two-part base member A; a cap or slide B; anti-friction elements C; centering means D, and a bearing block E.

The two-part base member A comprises oppositely disposed mated sections 12—12, only one of which will be described in detail. Each of said sections is formed to include a bottom wall 13, and a side wall 14 extending at right angles to the bottom wall 13, the upper edge of the side wall 14 being provided with an overhanging flange 15. The base member is also formed with opposite end wall portions 16—16 terminating as indicated at 17 to permit movement of the slide B and providing abutments for parts of the centering means D hereinafter described.

The upper surface of the bottom wall 13 of the base member is provided with a depression 18 adapted to accommodate a portion of a bearing plate hereinafter referred to. The bottom wall 13, at each end of the bearing, projects a suitable distance beyond the end wall portions 16—16 as indicated at 19—19 to provide means for securing the bearing to the truck bolster plate 10, this being accomplished by means of rivets 20—20. The other section 12 of the two-part base member is identically similar to that just above described except for its opposite disposition, and said sections are secured together by rivets 21—21, extending through the bottom wall 13 of each section.

The cap B is preferably in the form of an elongated casting, having an upper portion 22 of a width substantially similar to that of the two-part base member when the same is assembled, and below the upper portion 22 the cap is off-set inwardly at each side to provide a groove 23 adapted for the reception of the overhanging flanges 15—15 of the base member A, the portions 24—24 of the slide B being disposed beneath said flanges, and serving to lock the cap B against vertical separation from the base member A while permitting longitudinal travel of said cap with respect to the base member. The cap B is substantially of the same length as the distance between the end wall portions 16—16 of the base member A, and said cap is provided with extensions 25—25 at each end, which are movably disposed between the adjacent ends of the end wall portions 16—16 on the base member A, as best shown in Figure 2. Disposed in the depression 18 in the sections of the base member A is a bearing plate 26, which extends entirely across the two sections of the base member A, and interposed between the under-surface 27 of the cap B and the bearing plate 26, are the anti-friction elements C.

The anti-friction elements C as shown are preferably in the form of elongated rollers, and are of such diameter that when in position, they support the cap B in such manner that during longitudinal movement of the cap with reference to the base member A, some clearance is made between the flanges 15—15 of the base member A and the interlocking portions of the cap B, to avoid friction.

The centering means D include two followers 28—28, one of said followers being disposed at one side of the anti-friction elements C while the other follower 28 is disposed at the opposite side of said anti-friction elements; the followers and the associated parts at each end of the anti-friction bearing are identically similar except for their opposite disposition, and similar reference characters will be utilized to designate like parts of both. Each follower 28 extends transversely across the housing and is substantially of the same length as the adjacent roller with which it abuts, and adjacent each end of the follower, on its rear face, there is provided a stud 29, about which is disposed a coiled spring 30, the rear end of each coiled spring bearing against a follower 31 which extends across the housing and abuts against the inner surfaces of the end wall portions 16—16 of the base member A, and the inner surface of the adjacent extension 25 on the cap B.

With the construction just described, the cap B may be of substantial depth, and in the top of the cap B there is provided a centrally disposed relatively deep well 32, which well is preferably rectangular in conformation. The well 32 is adapted for the detachable reception of the bearing block E, said block being of such dimensions as to fit nicely into the well 32, and interposed between the under-surface of the bearing block E and the bottom of the well 32 is a plurality of shims 33, the removal or addition of which with reference to the bearing block E regulates the desired vertical height of the bearing block E and consequently of the overall vertical height of the entire anti-friction bearing.

In operation, when the body and truck bolsters approach each other and move in opposite directions, engagement will be brought about between the body bolster and the bearing block E, and the relative movement between the bolsters will effect movement of the bearing block, of the cap B, and of the anti-friction elements C in the same direction. During this movement, assuming it to be toward the right, as viewed in Figure 1, the right-hand follower 28 will be carried toward the end wall portions 16, and the springs 30 will be compressed between the follower 28 and the follower 31 which bears against the stationary end wall portions 16—16, while the left hand follower 31 will be picked up by the extension 25 on the cap and compress the left hand springs 30 against the left hand follower 28. Movement of the cap B will be permitted due to the clearance afforded between the spaced end wall portions 16—16, as will be understood. The operation of the anti-friction bearing is the reverse to that explained should the movement of the cap be toward the left as viewed in Figure 1, instead of toward the right.

In assembling the anti-friction bearing, the bearing plate 26, the anti-friction members C, the followers 28 and 31 and springs 30, are placed in position, and the cap B is interengaged with the overhanging flanges of the sections of the base member A prior to securing the two sections together after which said sections are permanently secured together by the rivets 21—21. The simple operation of securing said sections together produces a bearing, the operative parts of which are substantially entirely housed and which operates to center the anti-friction elements as well as the cap B, after each operation. The bearing after being assembled is a complete unit and may be rigidly and permanently applied to its position on the bolster 10. The required number of shims 33 may be placed within the well 32 and the bearing block E placed in position. Adjustment of the vertical height of the bearing block E and consequently of the overall vertical height of the entire bearing, may be accomplished by removing shims from beneath the bearing block if the overall vertical height of the bearing is too great, or by adding additional shims if the height is not great enough, and on making the adjustment it is only necessary to jack up the car to provide enough clearance to permit removal and replacement of the block E.

An important feature of the invention resides in the fact that the adjustment of the overall vertical height of the bearing may be made from the exterior thereof without the necessity of disturbing any of the operative parts of the bearing.

While I have herein shown and described what I consider the preferred manner of carrying out the invention, the same is merely illustrative, and I contemplate all changes and modifications which come within the scope of the claims appended hereto.

I claim:

1. In an anti-friction device, in combination with the body and truck bolsters of a railway car; a two-part base member having upstanding side walls provided with overhanging flanges on their upper edges, bottom walls, and spaced end wall portions at each end; a cap provided with longitudinally extending grooves adapted for the reception of the overhanging flanges on the side walls of said base member, and each end of said cap having an extension adapted to be movably disposed between the end wall portions of said base member; anti-friction means interposed between the undersurface of said cap and said base member and adapted to movably support said cap; centering means including springs arranged at each side of said anti-friction means and adapted to be flexed by movement of the latter; a follower interposed between said springs and the extension on said cap and the end wall portions at each end of the device, said cap being interlocked with said two-part base member when the latter is secured in position, and co-operating with said base member to maintain the various parts of said device in permanently assembled relation, said cap being provided with a well in its upper surface; a bearing block removably disposed in said well and projecting above the latter and adapted to be engaged by said body bolster; and a plurality of shims disposed in said well and removably interposed between said bearing element and the bottom of said well, whereby the vertical height of the bearing face of said element and hence the overall height of said device may be adjusted from the exterior of the anti-friction device without disturbing the operative parts thereof.

2. In a side bearing, the combination with a body and truck bolster having limited vertical clearance therebetween, said body bolster having a bearing surface; of a housing fixedly secured to one of said bolsters and provided with a bearing surface; a cap having a centrally disposed pocket open at the top; a block removably disposed in said pocket, said block having a flat top bearing surface adapted to be engaged by the body bolster bearing surface, and held by the walls of said pocket against horizontal displacement; a plurality of super-imposed shims disposed in said pocket and interposed between the bottom of the latter and said block, said shims being removable to provide adjustment of the vertical height of said block with reference to said cap; anti-friction means within said housing interposed between said cap and the bearing surface of the housing and supporting said cap for operative movement; and means co-operating with said anti-friction means, said base member and said cap, to maintain the anti-friction means and said cap in central position when free from load.

3. In an anti-friction device, in combination with the body and truck bolsters of a railway car; of a two-part housing composed of two complementary members, each having an upstanding side wall provided with an overhanging flange on its upper edge, a bottom wall and short end wall portions at each end, said complementary members together forming the complete housing, with spaced side walls and spaced end wall portions at each end thereof; means for rigidly securing said complementary members together; a cap provided with longitudinally extending grooves adapted for the reception of the overhanging flanges on the side walls of said housing, and each end of said cap having an extension adapted to be movably disposed between the end wall portions of said housing; anti-friction means interposed between the undersurface of said cap and said housing and adapted to movably support said cap; centering means including springs arranged at each side of said anti-friction means and adapted to be flexed by movement of the latter; and a follower interposed between said springs and the extension on said cap and the end wall portions at each end of the device, said cap being permanently interlocked with said two-part housing when the parts of the housing are rigidly secured together, and co-operating with said housing to maintain the various parts of said device in permanently assembled relation.

In witness that I claim the foregoing I have hereunto subscribed my name this 22nd day of December, 1926.

JOHN F. O'CONNOR.